US008471818B2

(12) United States Patent
Wu et al.

(10) Patent No.: US 8,471,818 B2
(45) Date of Patent: Jun. 25, 2013

(54) FLEXIBLE DATA ENTRY DEVICE

(75) Inventors: Kun-Tsan Wu, Shindian (TW); Li-Wen Tien, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 176 days.

(21) Appl. No.: 12/944,851

(22) Filed: Nov. 12, 2010

(65) Prior Publication Data

US 2011/0304562 A1    Dec. 15, 2011

(30) Foreign Application Priority Data

Jun. 11, 2010   (CN) .......................... 2010 1 0198448

(51) Int. Cl.
   *G09G 3/02*    (2006.01)
(52) U.S. Cl.
   USPC ...................................................... 345/168
(58) Field of Classification Search
   USPC ............. 345/156–184; 400/491, 472; 341/22
   See application file for complete search history.

(56) References Cited

U.S. PATENT DOCUMENTS

| 6,655,863 B2 * | 12/2003 | Lin ............................... 400/491 |
| 6,867,712 B2 * | 3/2005 | Tai .................................. 341/22 |
| 2009/0223641 A1 * | 9/2009 | Cheng ........................... 160/318 |
| 2010/0311479 A1 * | 12/2010 | Sip et al. .................... 455/575.4 |
| 2012/0019401 A1 * | 1/2012 | Wu et al. ......................... 341/22 |

* cited by examiner

*Primary Examiner* — Amr Awad
*Assistant Examiner* — Damon Treitler
(74) *Attorney, Agent, or Firm* — Altis Law Group, Inc.

(57) ABSTRACT

A data entry device includes a flexible base, a receiving module, a rolling mechanism, and a stop mechanism. The receiving module includes a sleeve and a subsidiary cover detachably attached to the sleeve. The base is received in the sleeve. The rolling mechanism rotates the base. One end of the base is secured to the rolling mechanism, and the other end of the base is secured to the subsidiary cover. The stop mechanism is for controlling the movement of the rolling mechanism. A selected length of the base exposed out of the sleeve can be controlled by the stop mechanism.

2 Claims, 8 Drawing Sheets

FLEXIBLE DATA ENTRY DEVICE

This application is one of the two related co-pending U.S. patent applications listed below. All listed applications have the same assignee and were concurrently filed herewith. The disclosure of each of the listed applications is incorporated by reference into all the other listed application.

| Ser. No. | Title | Inventors |
| --- | --- | --- |
| 12/944,851 | FLEXIBLE DATA ENTRY DEVICE | Wu et al. |
| 12/944,855 | DATA ENTRY DEVICE WITH FLEXIBLE SHEET | Wu et al. |

BACKGROUND

1. Technical Field

The disclosure generally relates to data entry devices and, particularly, to a flexible data entry device for an electronic device.

2. Description of Related Art

Conventional data entry devices for computers are made of a number of rigid/hard keys for inputting information. The keys are arranged in a standard QWERTY format. This kind of data entry device occupies a large space. Because of the size, it is inconvenient to relocate this kind of data entry device.

Therefore, there is room for improvement within the art.

BRIEF DESCRIPTION OF THE DRAWINGS

Many aspects of the exemplary embodiment of a flexible data entry device can be better understood with reference to the following drawings. The components in the drawings are not necessarily drawn to scale, the emphasis instead being placed upon clearly illustrating the principles of the flexible data entry device for electronic device. Moreover, in the drawings, like reference numerals designate corresponding parts throughout the several views, in which.

DETAILED DESCRIPTION

The disclosure is illustrated by way of example and not by way of limitation in the accompanying drawings. It should be noted that references to "an" or "one" embodiment in this disclosure are not necessarily to the same embodiment, and such references can include the meaning of "at least one" embodiment where the context permits.

Figure 1:
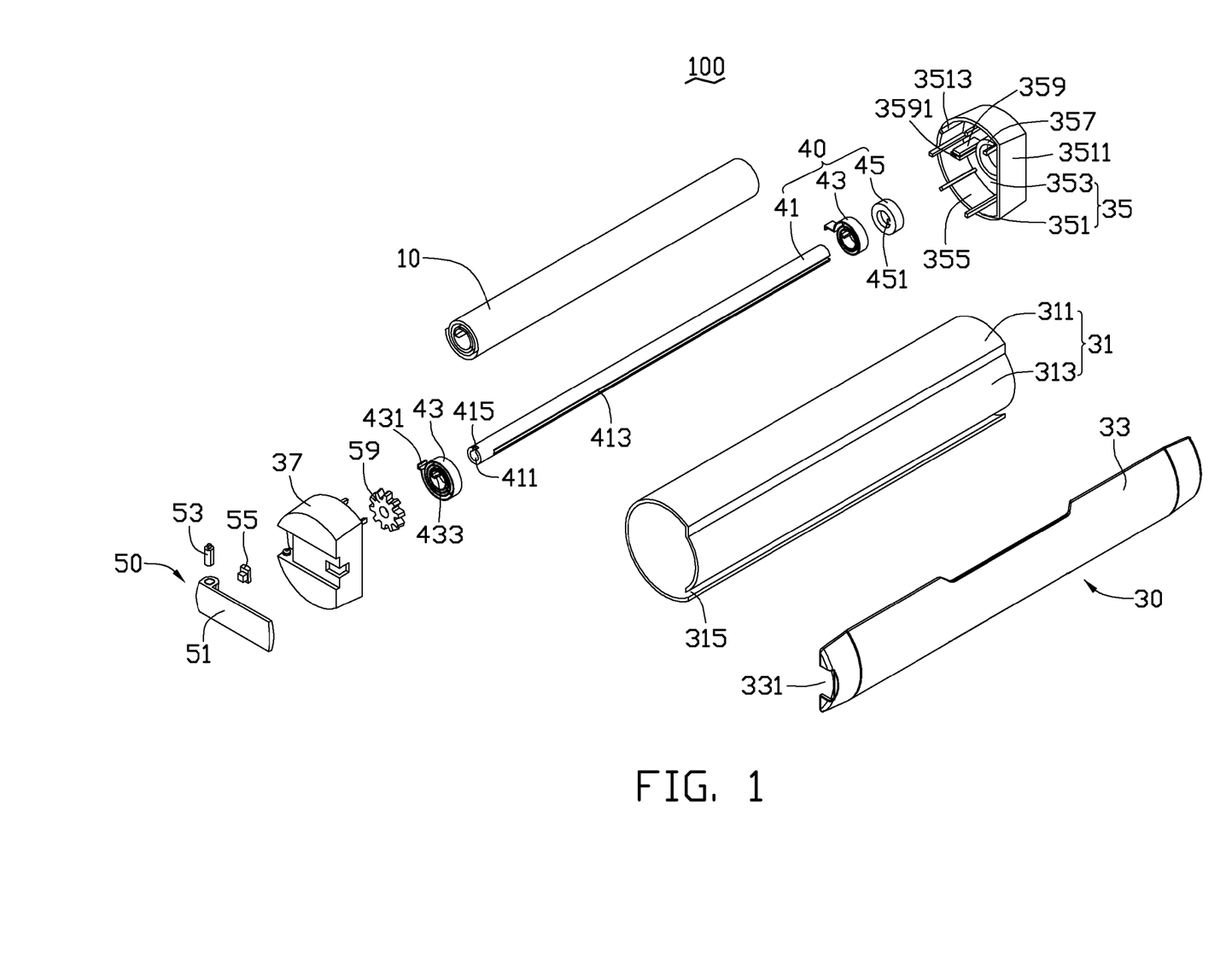
FIG. 1 is an exploded, isometric view of a flexible data entry device.
Figure 2:
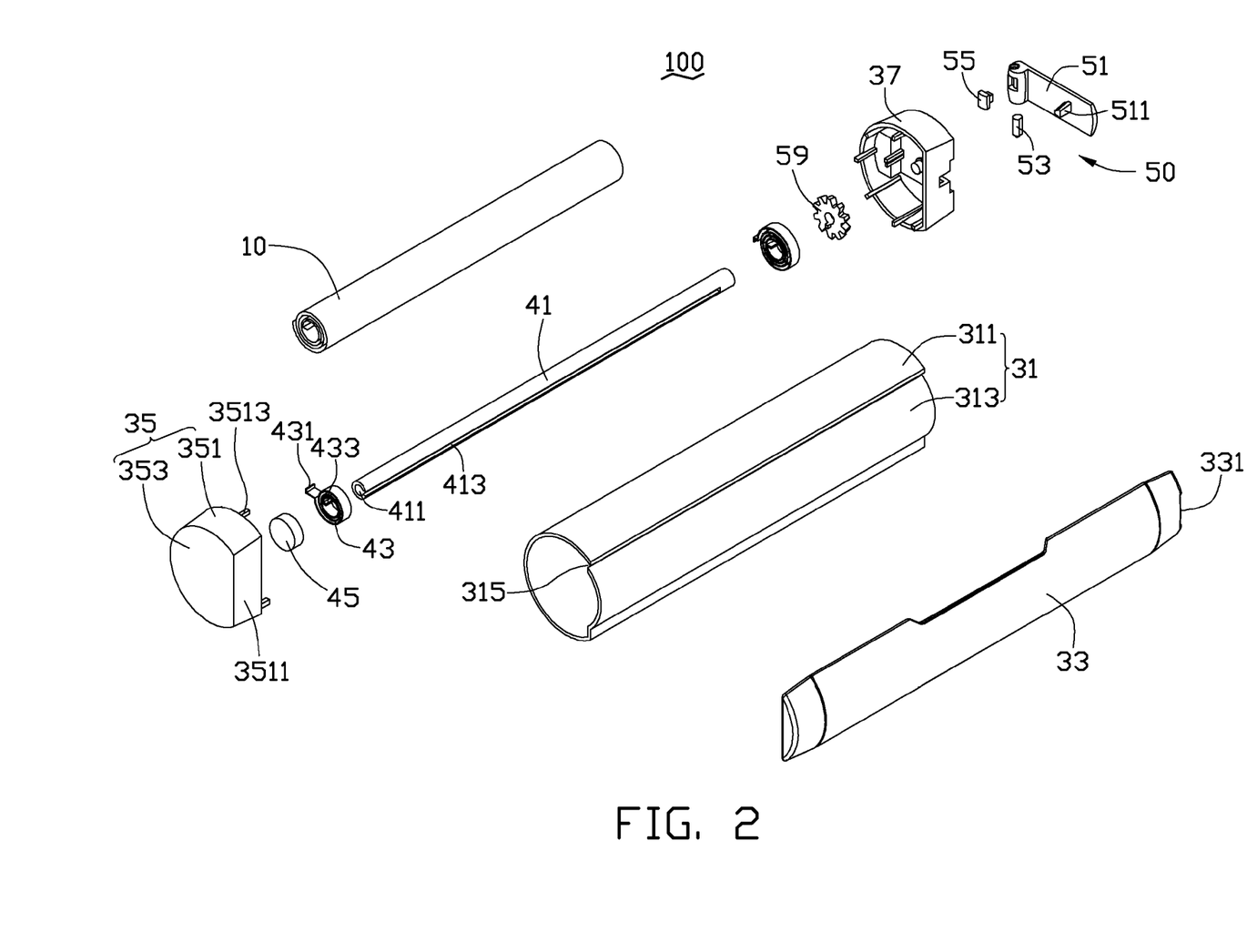
FIG. 2 is similar to FIG. 1, but viewed from another aspect.

FIGS. 1 and 2 illustrate a flexible data entry device 100 for an electronic device (not shown), such as a personal computer (PC). The flexible data entry device 100 includes a flexible base 10, a receiving module 30, a rolling mechanism 40, and a stop mechanism 50. In this exemplary embodiment, the base 10 is a flexible touch panel with icons (not shown) thereon used for inputting information to the electronic device. The base 10 is rolled on the rolling mechanism 40 and is received in the receiving module 30. The rolling mechanism 40 is secured to one end of the receiving module 30 to roll the base 10, and the stop mechanism 50 is secured to the other end of the receiving module 30 to stop the rolling mechanism 40. The stop mechanism 50 latches one portion of the base 10 of the receiving module 30 to prevent the base 10 from returning to the receiving module 30, when the user pulls out the base 10 from the rolling mechanism 40 to a selected length.

The receiving module 30 includes a sleeve 31, a subsidiary cover 33, a first cap 37, and a second cap 35. The sleeve 31 is used for receiving the base 10 and the rolling mechanism 40 therein. One end of the base 10 is fixed to the subsidiary cover 30 and the other end of the base 10 is secured to the rolling mechanism 40. The subsidiary cover 33 is detachably secured to the sleeve 31. When the subsidiary cover 33 is removed from the sleeve 31, the base 10 can be drawn out from the receiving module 30. The first cap 37 is oriented at one end of the sleeve 31, and the second cap 35 is oriented at the other end of the sleeve 31. The stop mechanism 50 is mounted on the first cap 37 to stop the rolling mechanism 40. The rolling mechanism 40 is rotatably secured to the first and second caps 37 and 35. In the exemplary embodiment, the first and second caps 37 and 35 are made of magnetic attractive materials, so that the subsidiary cover 33 can be attracted by and be secured to the first and second caps 37 and 35 by magnetic force.

The sleeve 31 has a portion bent inwards for forming a recess 313 to receive the subsidiary cover 33. An entrance 315 is defined in the sleeve 31 to form a passage for the base 10. The subsidiary cover 33 is used for drawing the base 10 out of the sleeve 31 through the entrance 315. A notch 331 is defined in one end of the subsidiary cover 33.

Figure 3:
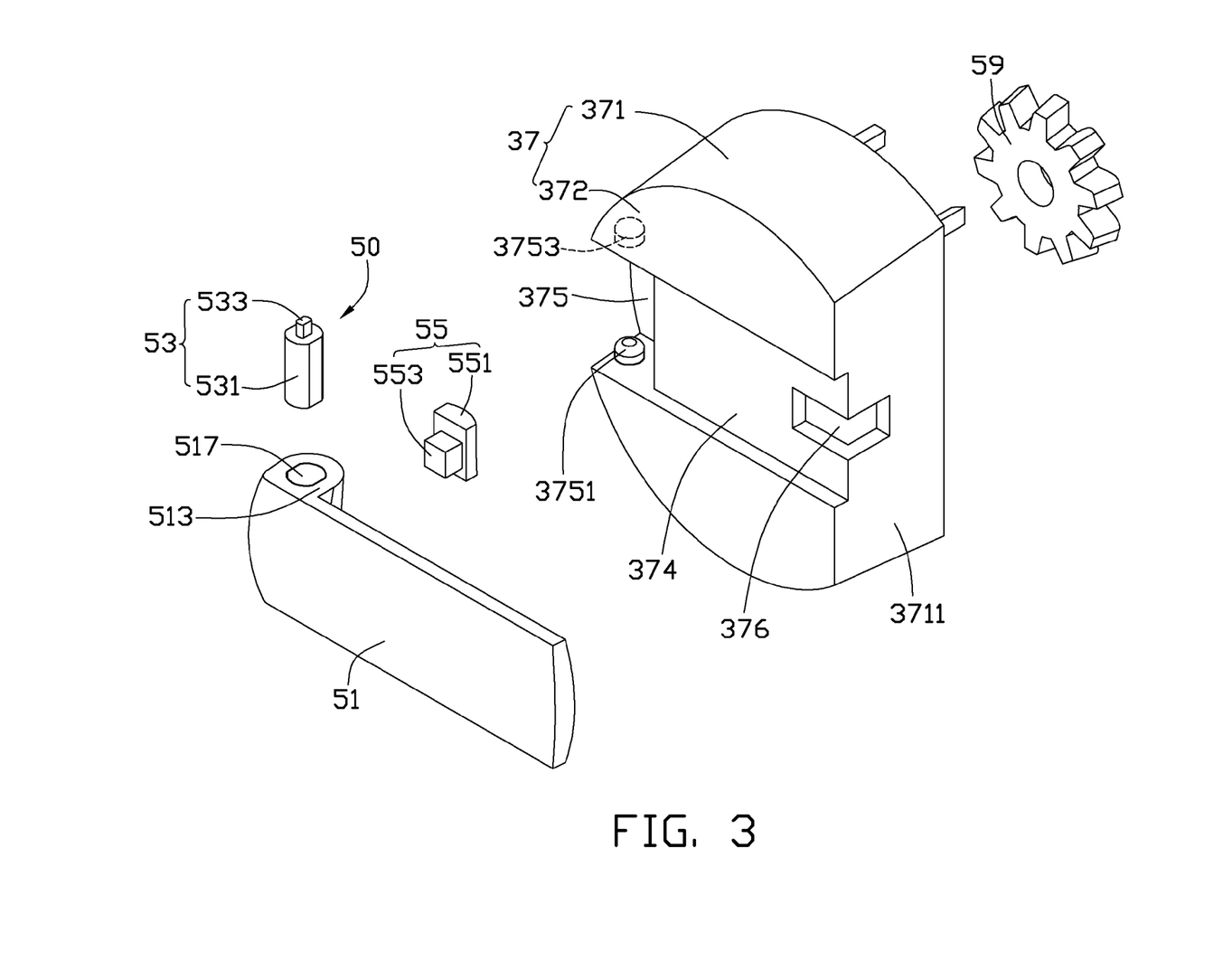
FIG. 3 is an enlarged view of a stop mechanism and a first cap of FIG. 1.

Referring to FIGS. 2 and 3, the first cap 37 includes a flat portion 3711, a curved peripheral wall 371 and a bottom wall 372. A receiving space 373 is cooperatively defined by the flat portion 3711, the peripheral wall 371 and the bottom wall 372. A number of support beams 3713 project from the inner surface of the peripheral wall 371 to support the sleeve 31. A first receiving groove 374 and a second receiving groove 375 are defined in the outer surface of the bottom wall 372, and the first receiving groove 374 communicates with the second receiving groove 375, the second receiving groove 375 is deeper than the first receiving groove 374. A through hole 376 is defined in the bottom wall 372, and the through hole 376 communicates with the first receiving groove 374 and the receiving space 373. A projection 3751 protrudes from one sidewall of the second receiving groove 375 and extends into the second receiving groove 375. A receiving hole 3753 is defined in the other sidewall of the second receiving groove 375, aligning with the projection 3751. A post 377 and a block 378 project from the inner surface of the bottom wall 372 and are substantially parallel to axis of the first cap 37. A receiving slot 3781 is defined in the block 378.

Referring back to FIGS. 1 and 2, the second cap 35 includes a flat portion 3511, a peripheral wall 351, and a bottom wall 353. A receiving space 355 is cooperating with the flat portion 3511, the peripheral wall 351, and the bottom wall 353. A number of support beams 3513 project from the inner surface of the peripheral wall 351 to support the sleeve 31. A ring portion 357 and a block 359 are spaced apart and project from the inner surface of the bottom wall 353. A slot 3591 is defined in the block 359.

Referring back to FIG. 1, the rolling mechanism 40 includes a shaft 41, two scroll springs 43, and a bushing 45.

The other end of the base 10 is fixed to the shaft 41. The scroll springs 43 rotate the shaft 41. The bushing 45 is rotatably secured to the second cap 35 and supports the shaft 41.

The shaft 41 is a cylindrical sleeve with an axial hole 411 therethrough. An aperture 413 and a cutout 415 are defined in the shaft 41, the aperture 413 is substantially parallel to the axial hole 411 and receives the other end of the base 10. The cutout 415 is defined in one end of the shaft 41 and communicates with the axial hole 411. Each scroll spring 43 includes a first stopper portion 431 at one end and a second stopper portion 433 at the other end. A protrusion 451 projects from the bushing 45, the protrusion 451 is received in the aperture 413.

The stop mechanism 50 includes an operating element 51, a hinge 53, an elastic element 55, and a stop wheel 59. The operating element 51 is pivotably secured to the first cap 37 with the hinge 53 and the projection 3751. The elastic element 55 is secured to the operating element 51 and elastically resists the operating element 51 when the operating element 51 rotates relative to the first cap 37. The shaft 41 is fixed together with the shaft stop wheel 59. When the stop wheel 59 is stopped by the operating element 51, the shaft 41 cannot rotate.

Figure 4:
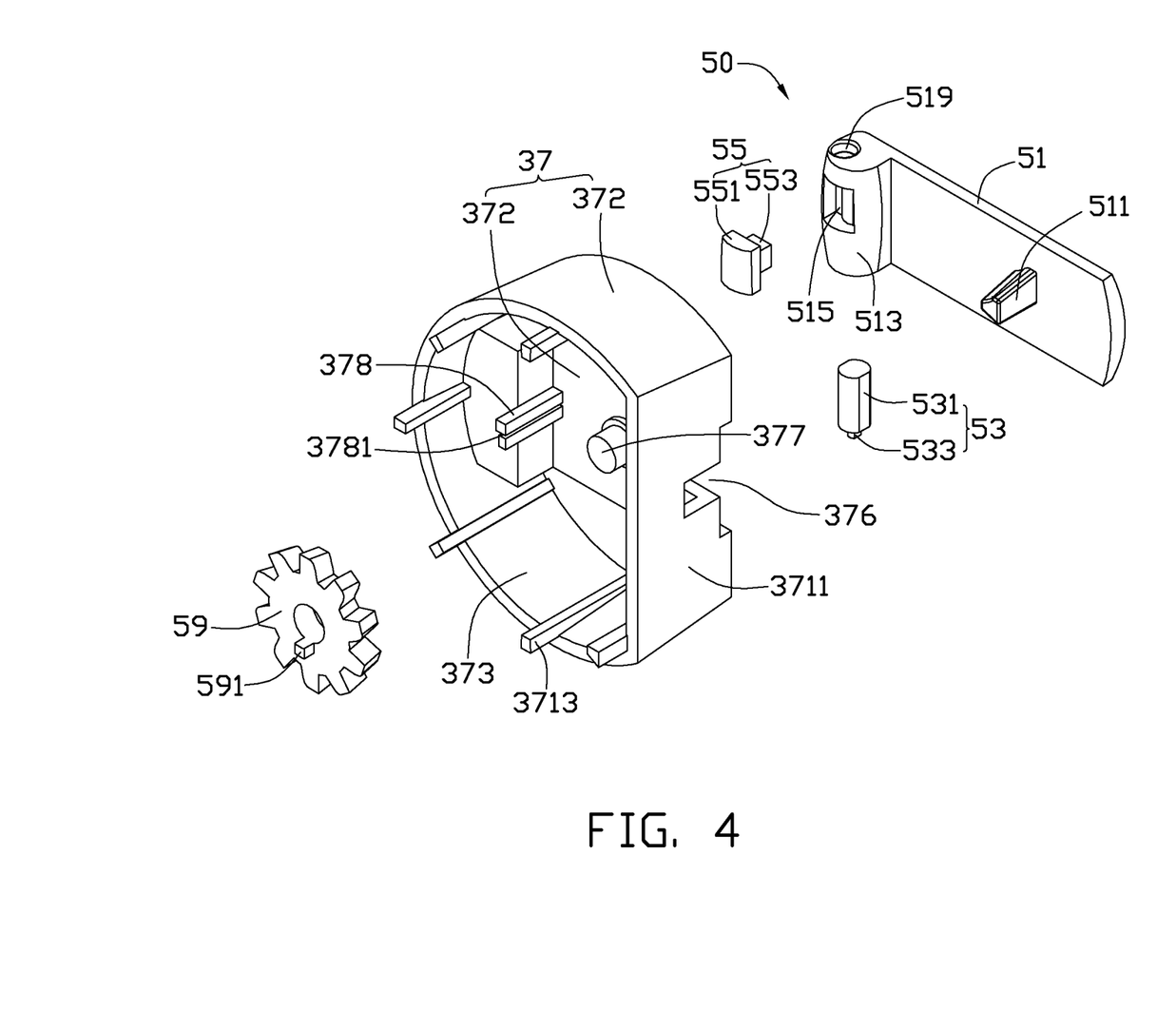
FIG. 4 is similar to FIG. 3, but viewed from another aspect.

Referring again to FIG. 4, an arm 511 and a barrel 513 project from the operating element 51. A stepped receiving cavity 515 is defined in the barrel 513, in which the elastic element 55 is received. A first receiving hole 517 is defined in one side of the operating element 51, in which the hinge 53 is received. And a second receiving hole 519 is defined in the other side of the operating element 51, in which the projection 3751 of the first cap 37 is received. The hinge 53 includes a housing 531 and a pivot 533 pivotably connected to the housing 531. The elastic element 55 includes a resisting portion 551 and a connecting portion 553. The resisting portion 551 is integrally formed with the connecting portion 553, for example, by injection molding. A latching portion 591 projects from the stop wheel 59. The latching portion 591 is received in the cutout 415 of the shaft 41. In the exemplary embodiment, the stop wheel 59 is a ratchet wheel. When the stop arm 511 resists the stop wheel 59, the stop wheel 59 can rotate in a single direction, for example, in a clockwise direction.

During assembly, one end of the base 10 is received in the axial hole 411 and is fixed to the shaft 41, for example, by sonic welding. The shaft 41 is inserted into the sleeve 31, and the other end of the base 10 passes through the entrance 315 of the sleeve 31. The second stopper portion 433 of each scroll spring 43 is secured to the shaft 41, and each scroll spring 43 is coiled around the shaft 41. The stop wheel 41 is secured to one end of the shaft 41, and the latching portion 591 is received in the cutout 415. The bushing 45 is secured to the other end of the shaft 41 and is then rotatably received in the ring portion 357 of the second cap 35. Then, the post 377 passes through the stop wheel 59 and is received in the axial hole 411 of the shaft 41. One end of the first shaft 41 is rotatably secured to the first cap 37, and the other end is rotatably secured to the second cap 35.

Then, the second stopper portion 433 of one of the scroll springs 43 is inserted into the slot 3591 of the second cap 35 and is retained by the block 359. Similarly, the other scroll spring 43 is fixed to the first cap 37. The connecting beams 3513 and 3713 resist the inner surface of the sleeve 31, and the sleeve 31 is secured together with the first cap 37 and the second cap 35, for example, by sonic welding.

The stop mechanism 50 is secured to the first cap 37 to control the movement of the shaft 41. The connecting portion 553 of the elastic element 55 is received in the stepped receiving cavity 515 and is fixed to the operating element 51, for example, by sonic welding. When the elastic element 55 is fixed to the operating element 51, the resisting portion 551 projects from the barrel 513. The hinge 53 is inserted into the first receiving hole 517 with the pivot 533 extending from the side wall of the barrel 513. The pivot 533 is rotatably received in the receiving hole 3753, and the projection 3751 is rotatably received in the second receiving hole 519. Finally, the other end of the base 10 is fixed to the subsidiary cover 33. Thus, the data entry device 100 is assembled, as shown in FIG. 5.

Figure 5:
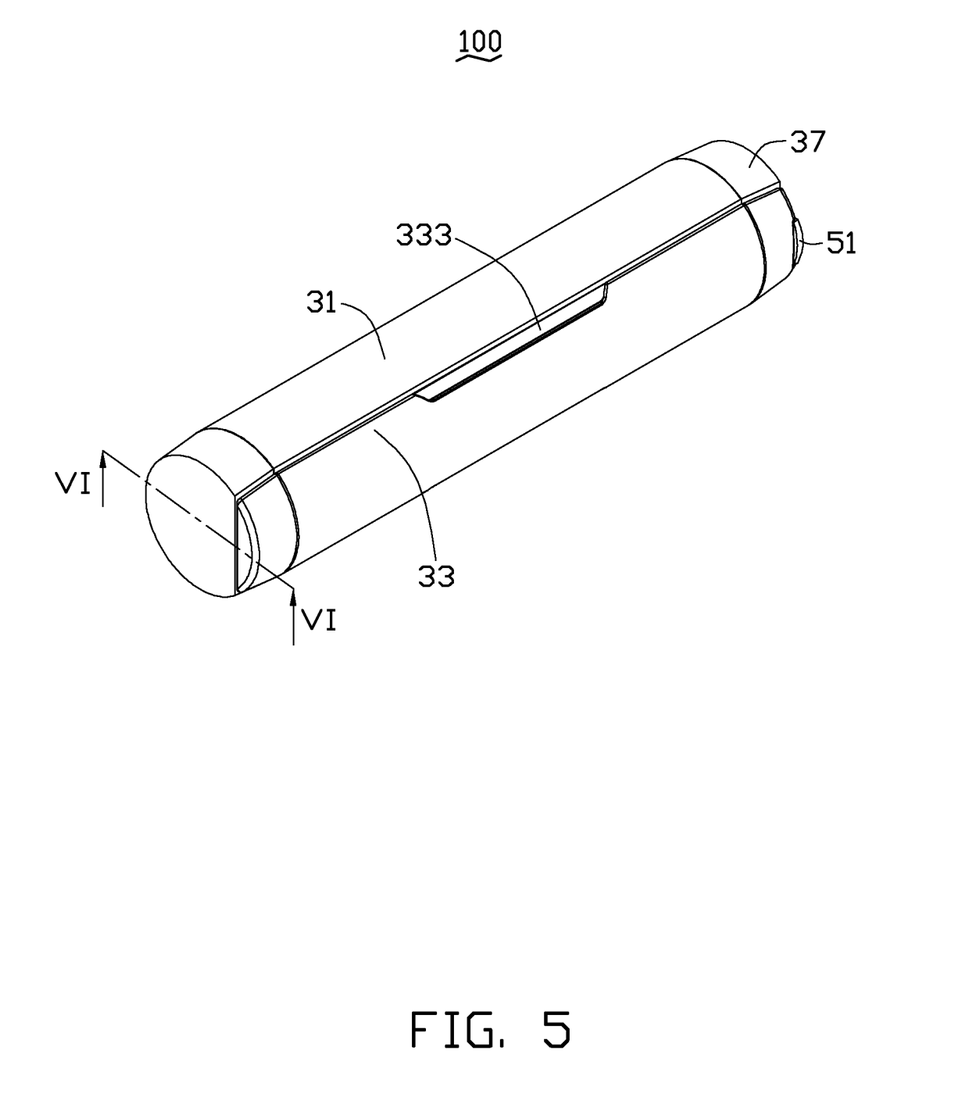
FIG. 5 is an assembled, isometric view of the flexible data entry device in a rolled state.
Figure 6:
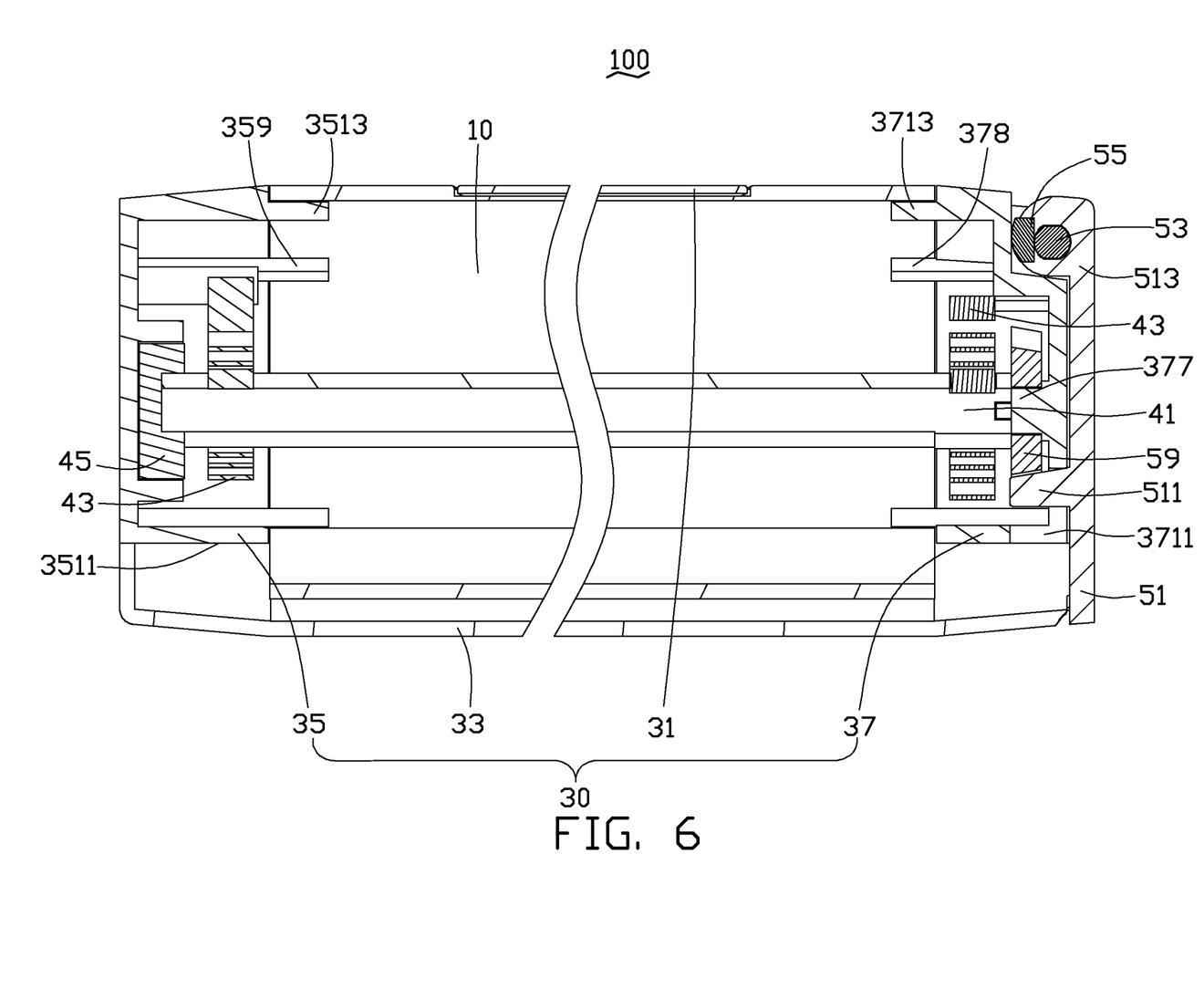
FIG. 6 is a cross sectional view of FIG. 5 taken along line VI-VI.

Referring to FIGS. 5 and 6, when the data entry device 100 is in a rolled state, the stop arm 511 is received in the stop wheel 59 and stops the stop wheel 59 from rotating in the counterclockwise direction. The subsidiary cover 33 is detachably attached to the sleeve 31 and is attracted by the first cap 37 and the second cap 35 by magnetic force therebetween. One end of the operating element 51 is received in the notch 331 of the subsidiary cover 33.

Figure 8:
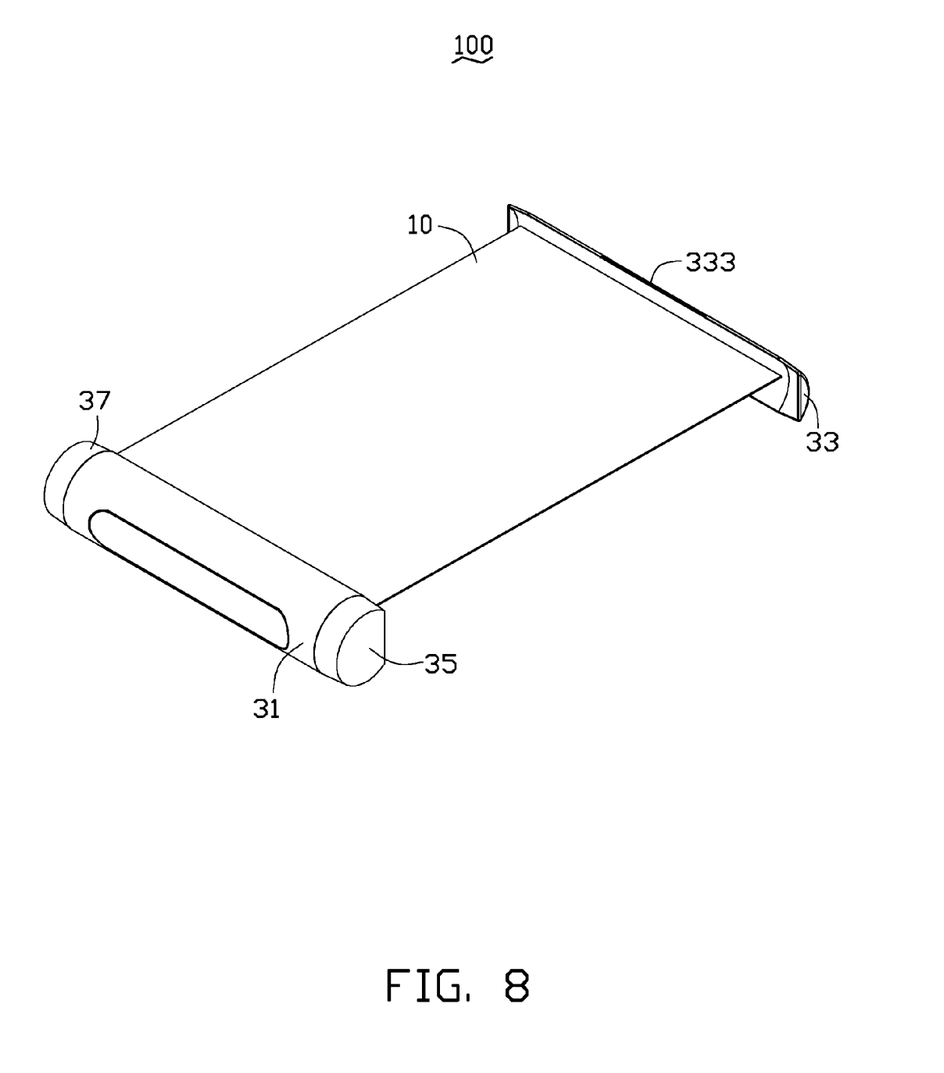
FIG. 8 is an assembled view of the data entry device of FIG. 1, but showing an open state.

When the data entry device 100 is used to input information for the electronic device, first, the subsidiary cover 33 is separated from the sleeve by the user. When the subsidiary cover 33 moves, the base 10 is pulled out of sleeve 31 through the entrance 315 and drives the shaft 41 to rotate. At the same time, the scroll springs 43 are elastically deformed by the shaft 41. When the base 10 is pulled out of the sleeve 31, the base 10 can be used to input information when the data entry device 100 is electrically connected to the portable electronic device, as shown in FIG. 8.

Figure 7:
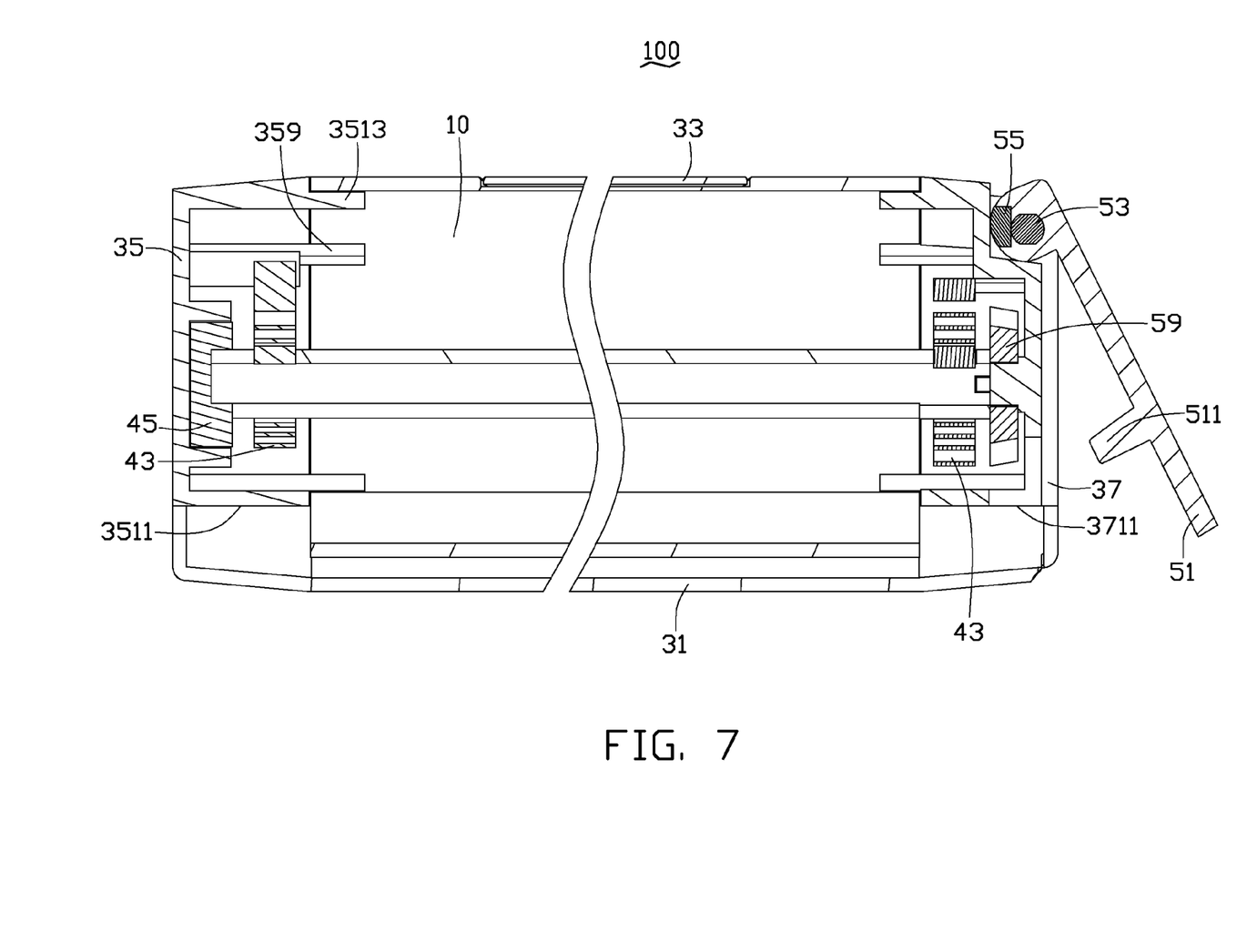
FIG. 7 is similar to FIG. 6, but showing another state.

Referring to FIG. 7, to roll the data entry device 100 for carrying, the operating element 51 is drawn out of the groove 374 and is rotated relative to the first cap 37. The stop arm 511 is separated from the stop wheel 59, the stop wheel 59 is driven to rotate counterclockwise under the elastic force of the scroll springs 43. When the base 10 is pulled by the rolling mechanism 40, the base 10 is coiled around the shaft 41, and the first and second caps 37 and 35 attract the subsidiary cover 33.

In the exemplary embodiments of the data entry device, the stop mechanism 50 is used to control the base 10 exposed out of the sleeve 31, the rolling mechanism 40 is used to roll the base 10 to allow the base 10 automatically received in the sleeve 31. Thus, the data entry device 100 is easy to carry and keep clean.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A flexible data entry device comprising:
   a flexible base for inputting information;
   a receiving module, the receiving module including a sleeve, a first cap, a second cap, and a subsidiary cover detachably attached to the sleeve, the first cap and the second cap secured to opposite ends of the sleeve, the base being received in the sleeve, one end of the base secured to the subsidiary cover;
   a rolling mechanism for rotating the base, the other end of the base secured to the rolling mechanism; and
   a stop mechanism secured to the first cap, the stop mechanism keeping a selected length of the base exposed out of the sleeve;
   wherein the stop mechanism includes a stop wheel and an operating element, the stop wheel is fixed to the rolling mechanism, one end of the operating element is hinged to the first cap to allow the operating element to rotate relative to the first cap, another end of the operating element detachably resists the stop wheel to prevent the stop wheel from rotating; and wherein the rolling mechanism includes a shaft and a scroll spring, the shaft is rotatably attached to the first and second caps, one end of the scroll spring is secured to either the first cap or the second cap, and the other end of the scroll spring is secured to the shaft, both the first and the second caps include a flat portion, the subsidiary cover is attracted to the flat portions by magnetic force.

2. A flexible data entry device comprising:

a flexible sheet for inputting information;

a sleeve receiving the flexible sheet, a first cap and a second cap secured to opposite ends of the sleeve;

a subsidiary cover detachably attached to the sleeve, one end of the flexible sheet secured to the subsidiary cover;

a rolling mechanism for rotating flexible sheet, the other end of the flexible sheet being secured to the rolling mechanism; and a stop mechanism secured to the first cap, the stop mechanism keeping a selected length of the sheet exposed out of the sleeve;

wherein both of the first cap and the second cap include a flat portion, the subsidiary cover is attracted to the flat portions by magnetic force; and wherein the rolling mechanism includes a shaft and a scroll spring, the shaft is rotatably attached to the first and second caps, one end of the scroll spring is secured to either the first cap or the second cap, and the other end of the scroll spring is secured to the shaft.

* * * * *